United States Patent [19]

Beggs et al.

[11] 4,251,267
[45] Feb. 17, 1981

[54] METHOD FOR DIRECT REDUCTION OF METAL OXIDE TO A HOT METALLIZED PRODUCT IN SOLID FORM

[75] Inventors: Donald Beggs; Robert M. Escott, both of Charlotte, N.C.

[73] Assignee: Midrex Corporation, Charlotte, N.C.

[21] Appl. No.: 69,408

[22] Filed: Aug. 24, 1979

Related U.S. Application Data

[62] Division of Ser. No. 940,806, Sep. 8, 1978, Pat. No. 4,188,022.

[51] Int. Cl.³ .............................................. C21B 13/02
[52] U.S. Cl. ........................................................... 75/35
[58] Field of Search ...................................... 75/34, 35

[56] References Cited

U.S. PATENT DOCUMENTS

| | | | |
|---|---|---|---|
| 2,875,035 | 2/1959 | Graham et al. | 75/34 |
| 2,947,620 | 8/1960 | Whitehouse et al. | 75/34 |
| 4,160,663 | 7/1979 | Hsieh | 75/35 |

*Primary Examiner*—M. J. Andrews
*Attorney, Agent, or Firm*—R. H. Dougherty

[57] ABSTRACT

A method for the continuous direct reduction of metal oxides, ores, etc. to a hot metallized product in solid form. A unique gas seal is employed to prevent the leakage of reduction gas from the bottom of the closed shaft furnace when the product is being discharged which does not affect the discharge temperature of the product.

12 Claims, 2 Drawing Figures

METHOD FOR DIRECT REDUCTION OF METAL OXIDE TO A HOT METALLIZED PRODUCT IN SOLID FORM

This is division, of application Serial No. 940,806, filed Sep. 8, 1978 now U.S. Pat. No. 4,188,022.

BACKGROUND OF THE INVENTION

This invention relates to a method for the direct reduction of metal oxides, ores, and the like to a highly metallized product which is discharged at high temperature and is particularly well suited for briquetting or other means of densification.

Cold discharge furnaces for the direct reduction of iron oxides to sponge iron have proven to be very successful commercially. However, merely omitting the cooling means for a direct reduction furnace is insufficient to achieve a satisfactory hot discharge furnace. In counterflow shaft type furnaces in general, and in shaft furnaces for direct reduction of iron in particular, the highest gas pressure in the furnace is always in the lower region of the furnace due to the upwardly flowing gases. In the direct reduction of iron, the gases in the furnace are highly flammable due to the high content of CO and $H_2$ which are necessary for reduction of iron.

In shaft furnaces containing highly flammable gases, the furnace discharge region from which the processed solids are discharged is subject to the hazards of fire which can both harm personnel and damage equipment. This is particularly true where the solids are discharged hot for further processing such as the hot briquetting of direct reduced iron. Thus, the principal problem which must be overcome is that the furnace discharge outlet must be provided with means for preventing leakage of highly combustible gas. Also, the seal gas must not adversely affect the discharge temperature of the hot product. Mechanical valves or locks have been tried without success in hot discharge direct reduction furnaces. These mechanical devices tend to become bound or stuck because of the softness and stickiness of the hot reduced iron product. This usually causes such valves to leak.

In the present invention, a hot discharge shaft furnace for the direct reduction of iron is directly coupled to a hot briquetting machine for densifying the direct reduced iron product. Although the hot briquetting machine is directly coupled to the furnace discharge, it is isolated from the highly flammable gases which are maintained at relatively high pressure in the reduction furnace by a seal gas system at the lower end of the furnace. This seal gas system insures that the gases present at the furnace discharge are non-flammable despite the highly flammable character of the gases present within the reduction furnace.

OBJECTS OF THE INVENTION

It is the principal object of this invention to provide a direct reduction furnace capable of continuously discharging hot direct reduced metallized product suitable for subsequent agglomeration or easy handling.

It is also an object of this invention to provide a hot discharge direct reduction furnace which requires no mechanical seal to limit the escape of furnace gases or reducing gases through the product discharge opening.

It is another object of this invention to provide a means for sealing the discharge opening against atmospheric gases.

It is also an object of this invention to provide a method for producing hot direct reduced iron pellet product.

SUMMARY OF THE INVENTION

To achieve the objects of this invention, we provide a closed shaft furnace containing highly combustible gases with gas seal at the furnace discharge to seal against out-leakage of the highly combustible gases. The gas seal includes means for recirculating a non-combustible gas through the lower region of the furnace at sufficient pressure to prevent the downflow of combustible gases.

BRIEF DESCRIPTION OF THE DRAWING

This invention is better understood by referring to the following detailed description and the appended drawings in which.

DETAILED DESCRIPTION

Figure 1:
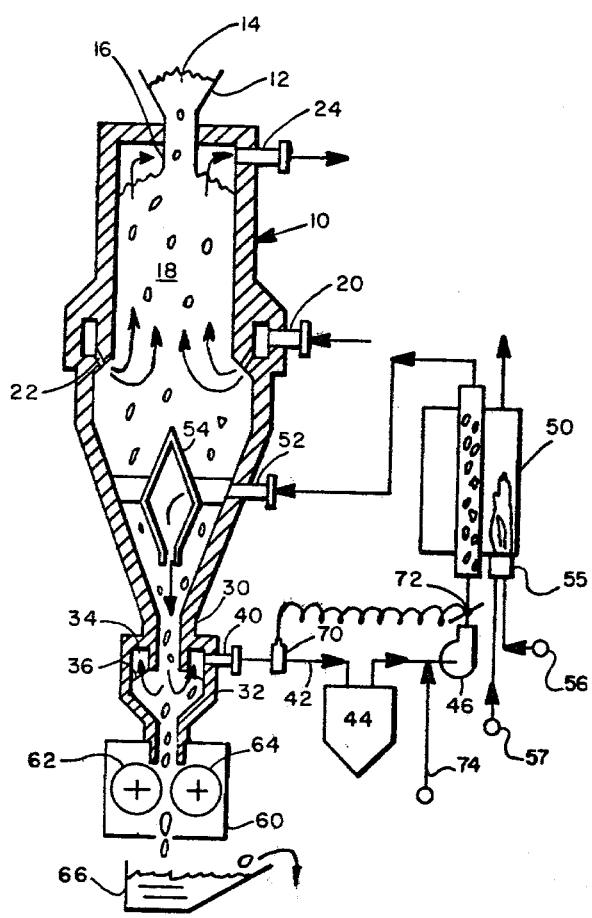
FIG. 1 is an elevational cross-section of the furnace of the invention with an associated product briquetter.

Referring now to the drawing, a vertical shaft furnace 10 has a feed hopper 12 mounted at the top thereof into which iron oxide pellets 14 or other particulate feed materials such as lump ore are charged. The pellets descend by gravity through one or more feed pipes 16 to form a bed 18, or burden, of particulate iron oxide containing material in the shaft furnace. At the central part of the shaft furnace 10 is a hot gas bustle and tuyere system indicated generally at 20 having gas ports 22 through which hot reducing gas is introduced to flow upwardly in countercurrent relationship to the movement of burden 18. Spent top gas exits the furnace through gas takeoff pipe 24.

At the bottom of the furnace 10 is a pellet discharge pipe 30 which connects the interior of the furnace to a small hopper 32 or seal gas disengaging chamber, which is filled with hot pellets discharging by gravity from the lower end of the furnace. The discharge pipe 30 extends into hopper 32 to form a gas disengaging plenum 34. The hopper being larger in diameter than pipe 30, the discharged pellets form an angle of repose as indicated at 36 through which seal gas is disengaged from the pellets in hopper 32. A seal gas takeoff outlet 40 removes seal gas from the plenum 34. A gas cleaning and recirculating circuit is provided to remove solids and condensible matter from the seal gas and to reheat it to the desired temperature for reintroduction to the discharge zone of the furnace. The removed seal gas flows through a takeoff pipe 42 to a cooler scrubber 44 wherein condensibles and particulates are removed. Pump or compressor 46 forces the cleaned seal gas through seal gas heater 50 wherein it is heated to an introduction of 600° to 800° C. or preferably to between 650° and 750° C., which is a preferred temperature range for that discharge of the pellets, and from whence it is reintroduced to the furnace 10 through inlet pipe 52 and seal gas distributor 54. Heater 50 is fired by suitable burners 55 from an air source 56 and a fuel source 57.

Beneath the hopper 32, a hot briquetting machine 60 includes counter-rotating rolls 62 and 64 which compress the hot reduced pellets to form a briquet product. The hot briquet product may be discharged into a quench tank 66 or may be cooled by any other desirable means such as air cooling.

The hot briquetting machine is a good volumetric feeder and is utilized as the furnace discharge control mechanism. The rate of discharge is directly related to the speed of rotation of the briquetting rolls.

Figure 2:
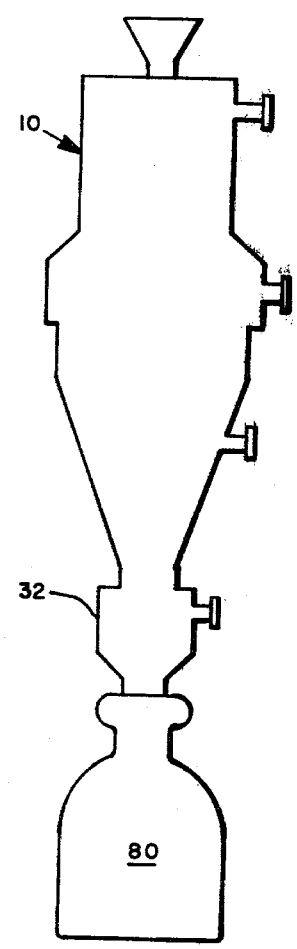
FIG. 2 is a schematic view of the invented furnace with an associated hot discharge container.

As an alternative to the hot briquetting machine of FIG. 1, a discharge control mechanism such as a wiper bar can be added to the bottom of discharge hopper 32 and the product may be discharged directly into a container 80 as shown in FIG. 2. This container is sealed after filling then transported to an electric arc steelmaking furnace and the pellets are charged hot into the furnace. This reduces the energy and time required to heat the charge to the melting point in the electric furnace.

A pressure sensor 70, which controls the pressure at slightly above atmospheric in the seal gas disengaging chamber, is shown located in the seal gas offtake pipe 42. This sensor, which could just as well be located in the chamber above the angle of repose, maintains a very low pressure in the chamber by controlling the action of a flow control valve 72 in the seal gas recirculating system. The seal gas pressure at distributor 54 is sufficient to prevent downflow of reducing gas from inlets 22 into the lower portion of the furnace. Thus the amount of reducing gas in the product is kept to a minimum.

In operation, the gas leakage from the furnace through the furnace discharge pipe 30 is principally recirculated seal gas with only small amounts of CO and $HL_{hd}$ 2 reducing gas. A small amount of seal gas makeup is provided at 74. The seal gas is preferably a high nitrogen gas such as products of combustion containing no free oxygen.

It is readily apparent that from the foregoing that we have invented a method for the production of a hot metallized iron product which is reduced to high metallization in a direct reduction shaft furnace and discharged hot in solid form for further processing without any attendant hazard.

What is claimed is:

1. A method for the direct reduction of metal oxides to a hot metallized iron product in solid form, comprising:
    (a) introducing particulate metal oxides to a generally vertical shaft furnace at the top thereof to create a packed bed burden therein;
    (b) removing reduced particulate material from the bottom of said shaft furnace to create a gravitational flow of material through said furnace;
    (c) passing reducing gas through said burden in counterflow relationship thereto and removing expended reducing gas from the top of said furnace;
    (d) introducing a heated seal gas at a temperature of from about 650° to about 750° C. and at a pressure above atmospheric to the lower region of said furnace; and
    (e) removing said seal gas from said product upon discharge from said furnace.

2. A method according to claim 1 further comprising discharging said product into a gas tight container.

3. A method according to claim 1 further comprising briquetting said product.

4. A method according to claim 1 further comprising discharging said product into a seal gas disengaging chamber from which seal gas is removed.

5. A method according to claim 4 further comprising continuously measuring the pressure in said chamber and controlling the removal of seal gas from said chamber in response to the pressure measurement.

6. A method for the direct reduction of metal oxides to a hot metallized iron product in solid form, comprising:
    (a) introducing particulate metal oxides to a generally vertical shaft furnace at the top thereof to create a packed bed burden therein;
    (b) removing reduced particulate material from the bottom of said shaft furnace to create a gravitational flow of material through said furnace;
    (c) passing reducing gas through said burden in counterflow relationship thereto and removing expended reducing gas from the top of said furnace;
    (d) introducing a heated seal gas at a pressure above atmospheric to the lower region of said furnace;
    (e) removing said seal gas from produced upon discharge from said furnace into a closed seal gas circuit;
    (f) cleaning, cooling, and reheating said seal gas in said circuit; and
    (g) reintroducing said reheated seal gas to said furnace.

7. A method according to claim 6 further comprising discharging said product into a gas tight container.

8. A method according to claim 6 further comprising briquetting said product.

9. A method according to claim 6 wherein said seal gas is heated to a temperature of from about 650° to about 750° C.

10. A method according to claim 6 further comprising discharging said product into a seal gas disengaging chamber from which seal gas is removed.

11. A method according to claim 10 further comprising continuously measuring the pressure in said chamber and controlling the removal of seal gas from said chamber in response to the pressure measurement.

12. A method according to claim 6 further comprising adding make-up gas to said seal gas circuit to replace gas lost by leakage.

* * * * *

UNITED STATES PATENT AND TRADEMARK OFFICE
CERTIFICATE OF CORRECTION

PATENT NO. : 4,251,267
DATED : February 17, 1981
INVENTOR(S) : Donald Beggs & Robert M. Escott It is certified that error appears in the above—identified patent and that said Letters Patent is hereby corrected as shown below:

Column 1, Line 36, after "combustible" insert -- furnace -- .

Column 2, Line 57, after "introduction" insert -- temperature -- .

Column 3, Line 30, change HLhd 2" to -- $H_2$ -- .

Column 4, Line 30, change "produced" to -- said product -- .

Signed and Sealed this

Ninth Day of February 1982

[SEAL]

Attest:

GERALD J. MOSSINGHOFF

Attesting Officer     Commissioner of Patents and Trademarks